United States Patent Office 3,236,794
Patented Feb. 22, 1966

3,236,794
VINYL HALIDE POLYMERS AND IMIDAZOLINE-METAL COMPOUND-EPOXY CURING SYSTEMS THEREFOR
Philip K. Isaacs, Brookline, Elizabeth C. Dearborn, Boston, and Melvin Nimoy, Hyde Park, Mass., assignors to W. R. Grace & Co., Cambridge, Mass., a corporation of Connecticut
No Drawing. Filed Oct. 11, 1960, Ser. No. 61,825
12 Claims. (Cl. 260—23)

The invention relates to plastic compositions having desirable thermosetting and adhesive characteristics. In a particular aspect it relates to polymers and copolymers of vinyl chloride.

Vinyl polymers are versatile materials responding to many uses and are available in plasticized or unplasticized form. The unplasticized or rigid resins are prepared to take maximum advantage of their excellent chemical resistance. Most uses, however, require modification of the polymers by the addition of plasticizers, fillers, and pigments to give them desirable properties for specific commercial applications and for processing. Plasticizers play an important role in modifying these resins to meet a wide variety of requirements.

Modification of the original polymer by the addition of processing aids or other additives frequently adversely affects its chemical resistance. Polyvinyl chloride, in general, requires a large amount of plasticizer for most applications. In use the excess plasticizer tends to migrate to the surface and consequently impairs the adhesive properties of the polymer. In addition, these polymers are thermoplastic which prohibits their use at high temperatures.

It is, therefore, an object of this invention to provide improved vinyl halide polymer compositions which are thermosetting in nature and adhere well to many surfaces. The improved compositions comprise a halogen containing polymeric material, an imidazoline curing agent, a metallic compound which regulates the curing action of the imidazoline, and an epoxy compound which together with the other components, provides increased adhesion, thermal stability and crosslinking of the polymer. In addition, fillers, dyes, pigments and other additives may be incorporated in the compositions depending on the use to which they are put. They may be processed by extrusion, calendering, molding, plastisol or organosol application or other standard fabricating techniques.

Imidazolines are highly effective curing agents for halogenated polymers. The use of these imidazolines alone, however, has definite disadvantages when added to certain vinyl polymer systems, such as paste grade polyvinyl chloride plasticized with dioctyl phthalate. One, is that the shelf life of the resulting plastisol is greatly reduced. In effect, the imidazoline solvates the polyvinyl chloride particles so as to produce a gel instead of a fluid after storing for several days at room temperature. The second disadvantage is that the product blackens, stiffens and evolves HCl on heating, and it is difficult to obtain a high degree of crosslinking without encountering these signs of degradation. This invention provides a means of preventing these two side effects while maintaining the advantages of imidazoline cure. In addition, solvent resistance is improved coupled with increased crosslinking while at the same time imparting adhesive properties to the polymeric material.

The imidazolines most useful in the practice of the invention may be defined as 2-substituted-2-imidazoline and 1,2-disubstituted-2-imidazoline having the structure:

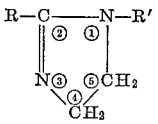

where R represents an aliphatic group containing 1 to 36 carbon atoms and R' may be hydrogen, or the group

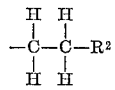

where $R^2$ may be hydrogen, hydroxyl, $NH_2$, or a chain containing aliphatic ester groups, other 2-substituted-2-imidazoline or 1,2-disubstituted-2-imidazoline groups, aliphatic amido groups, aliphatic amino groups or a combination of such groups. This definition is intended to include as equivalents such compounds where either or both of the 4 or 5 carbon atoms on the imidazoline ring are substituted with a lower alkyl group such as methyl or ethyl.

The imidazolines may be prepared by reacting alkylene diamines having amino groups on adjacent carbon atoms or polyalkylene polyamines with mono- or dicarboxylic acids under reactive conditions of temperature and pressure. Suitable amines include ethylene and propylene diamine, diethylene and dipropylene triamine, triethylene tetramine and tetraethylene pentamine. Representative monocarboxylic acids are acetic, caproic, pelargonic, lauric, palmitic, oleic and stearic acids. Typical dicarboxylic acids include dimerized fatty acids, adipic, pimelic, suberic, azelaic and sebacic acids.

The preferred imidazolines are those which in themselves are non-volatile and chemically stable at curing temperatures. In addition, they should be such that the uncured mixture with halogen containing polymer undergoes no change with time at room temperature. The low molecular weight imidazolines, such as lysidine, are effective curing agents but tend to form fumes at curing temperatures and hydrolyze at room temperature when exposed to moist air. Other imidazolines, such as octamethylene diimidazoline, are high melting crystalline solids that are difficult to incorporate uniformly in the polymer composition and have limited compatibility with some halogen containing polymers. The most useful of the imidazoline structures from these points of view are the reaction products of fat-derived acids with diethylene triamine and its homologues.

The class of metallic compounds which are operable in this invention are the oxides, sulfides and salts of metals of group IIB and IVA of the periodic table of elements. The specific metals are zinc, cadmium, mercury and lead and the compounds of these metals are limited to those which are soluble in ammonium salts or ammonia solutions and form ammonia complexes. The metallic compounds should preferably be in a finely divided state so as to present adequate surface for reaction and a particle size of about .5 micron or less has been found effective. While certain metal compounds will perform one or two of the three desirable functions, i.e., delayed blackening, better adhesion or less exudation, such materials do not fall in the operable general class described above.

There are a vast number of epoxy compounds which may be used in the practice of this invention. One group embraces the epoxidized triglycerides of vegetable and marine oil fatty acids. The vegetable oils include epoxidized castor, corn, hempseed, mustard seed, olive, peanut, poppy seed, soybean, tung and walnut oils. The marine oils include epoxidized cod liver, hering, menhaden, California sardine (pilchard), Japanese sardine, gray seal and whale oils.

Another group of epoxy compounds includes epoxidized esters of ethenoid alcohols with carboxylic acids. Typical alcohols include the monoethenoid monohydroxy alcohols, such as crotyl alcohol (2-buten-1-ol), oleyl alcohol, citronellol, cinnamyl alcohol and methyl tetrahydrobenzyl alcohol. Representative acids include the monocarboxylic and polycarboxylic acids such as acetic, caproic, pelargonic, lauric, palmitic, stearic, lignoceric, glutaric, adipic, pimelic, suberic, azelaic, phthalic and sebacic acid. Exemplary epoxidized esters falling within this group include 2,3-epoxybutyl acetate, 2,3-epoxybutyl caproate, 2,3-epoxybutyl palmitate, di(2,3 - epoxybutyl) adipate, di(2,3-epoxybutyl)-sebacate, 2,3-epoxycinnamyl laurate, di(2,3-epoxycinnamyl)-adipate and di(2,3-epoxybutyl)phthalate.

A further group of epoxy compounds includes epoxidized esters of monohydroxy and polyhydroxy alcohols and ethenoid carboxylic acids. Appropriate alcohols include methanol, ethanol, butanol, pentanol, octanol, hexadecanol, cyclopentanol, cyclohexanol, benzyl alcohol, ethylene glycol, propylene glycol, hexamethylene glycol, glycerol and trimethylolpropane. Suitable acids include: the monoethenoid monocarboxylic fatty acids, such as obtusilic, lauroleic, palmitoleic, oleic, elaidic and erucic acid; the polyethenoid monocarboxylic fatty acids, such as sorbic linoleic, hiragonic, linolenic, moroctic, arachidonic and methyl tetrahydrobenzoic acid; and the substituted mono- and polyethenoid monocarboxylic acids, such as ricinoleic and licanic acid. Monoethenoid dicarboxylic acids include maleic, fumaric, itaconic and aconitic acid. Representative epoxidized esters falling under this group include lower alkyl 9,10-epoxy-stearate; hexadecyl 9,10-epoxy-stearate; cyclopentyl 9,10-epoxystearate; cyclohexyl 9,10-epoxystearate; butyl 9,10,12,13-diepoxystearate; octyl 9,10,12,13-diepoxystearate; butyl 9,10-epoxypalmitate; butyl 9,10,12,13,15,16-triepoxystearate; butyl 12-hydroxy-9,10-epoxystearate; butyl 12-acetoxy-9,10-epoxystearate and methyl epoxy tetrahydrobenzyl methyl epoxy tetrahydrobenzoate.

Still another group of epoxy compounds which are useful in this invention includes the epoxidized esters of ethenoid alcohols and ethenoid carboxylic acids. Suitable alcohols include the monoethenoid monohydroxy alcohols, such as crotyl, oleyl, citronellol and cinnamyl alcohol. Typical acids include: the monoethenoid monocarboxylic fatty acids, such as lauroleic, palmitoleic, oleic, elaidac and erucic acid; the polyethenoid monocarboxylic acids, such as sorbic, linoleic, hiragonic, linolenic, moroctic and arachidonic and; the substituted mono- and polyethenoid monocarboxylic acids, such as ricinoleic and licanic acid; and the monoethenoid polycarboxylic acids, such as maleic, fumaric, itaconic, aconitic and 2-octenedioc acid. Illustrative epoxidized esters which are classified under this group include 2,3-epoxybutyl-9,10-epoxypalmitate; 2,3 - epoxybutyl-9,10-epoxystearate; 2,3-epoxybutyl-9,10,12,13-diepoxystearate; 2,3 - epoxybutyl-9,10,12,13,15,16-triepoxystearate; 2,3-epoxybutyl - 12 - hydroxy-9,10-epoxystearate; 2,3-epoxybutyl - 12 - acetoxy-9,10-epoxystearate; 2,3 - epoxycinnamyl-9,10-epoxypalmitate; 2,3-epoxycinnamyl-9,10,12,13-diepoxystearate; 2,3-epoxybutyl-2,3-epoxysuccinate; and di(2,3 - epoxybutyl)-2,3-epoxyoctanoate.

Another group comprises epoxidized olefins, diolefins and polyolefins, such as epoxidized 2-butene, 2-pentene, 2-methyl-2-butene, 2-methyl-2-pentene, 2,4-hexadiene, cyclobutene, cyclopentene, cyclohexene, cyclooctene, cyclopentadiene, and polybutadiene.

Epoxidation of the ethenoid compounds is readily obtained by use of typical epoxidzing agents such as peracetic acid, performic acid, or hydrogen peroxide. The epoxy groups in these compounds occupy an internal position at least one carbon atom away from any terminal point on the molecule chain.

The metal and epoxy compounds regulate the curing action of imidazolines on polyvinyl halides and produce unexpected improvements in the properties of the polymer. These materials have a very specific action on polyvinyl halide-imidazoline combinations compared to any other inorganic additive. They simultaneously retard blackening on heating, prevent gas evolution, improve adhesion to many surfaces, and augment resistance of the adhesive bond to water. Their action on polyvinyl chloride, for example, is entirely different from the well known stabilizing action of metal soaps. Many materials which perform well in the present system will accelerate the degradation of unvulcanized polyvinyl chloride compositions. Contrariwise, materials which normally control polyvinyl chloride degradation have no effect in this system. Another aspect of this invention is the plural function of the epoxy compound. On one hand, it provides the soft consistency needed for many applications and, on the other, it promotes infusibility and insolubility by increasing the number of crosslinkages which we believe to be in the order of about one per 10,000 to one per 500 molecular weight units.

The invention is further illustrated by the following examples. Proportions here and elsewhere herein are expressed as parts or percentages by weight. To simplify the presentation we have depicted what we believe to be the structure of the particular imidazolines used in the examples and they are reproduced and designated as follows:

*Imidazoline I*

One mole of sebacic acid, 2 moles of triethylene tetramine and 1 mole of oleic acid were reacted, resulting in a loss of 6 moles of water. The reaction was carried out for 4 hours at 150° C.–220° C. at 760–15 mm. of pressure in an atmosphere of nitrogen. The reactants were vigorously stirred throughout the reaction period. The product was a mixture of imidazolines in which the following structure was predominant:

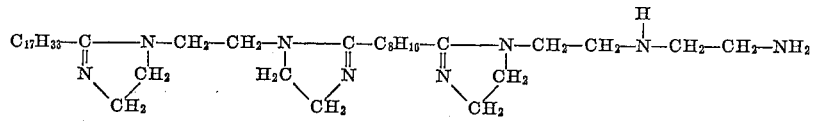

*Imidazoline II*

It was prepared by vigorously reacting 2 moles of oleic acid, 6 moles of triethylene tetramine and 5 moles of sebacic acid. The reaction was carried out for 4 hours at 150° C.–200° C. and 760–15 mm. pressure in a nitrogen atmosphere. The yield consisted of a mixture of products in which the imidazoline having the following structure predominated:

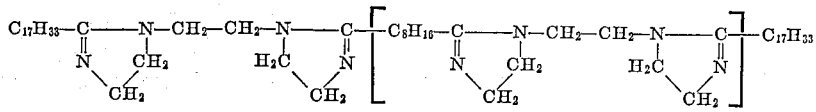

Imidazoline III

This compound was prepared by reacting equimolar amounts of acetic acid and triethylene tetramine for 4 hours at 150° C.–200° C. and 760–15 mm. of pressure in an atmosphere of nitrogen. The reactants were vigorously agitated throughout the reaction period. This yielded a mixture of products in which the imidazoline having the following structure predominated:

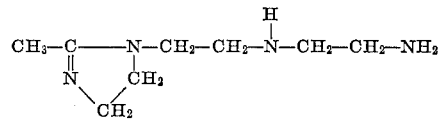

Imidazoline IV

It was prepared by contacting two moles of oleic acid and one mole of sebacic acid with two moles of triethylene tetramine. The reaction was carried out for 4 hours at 150° C.–220° C. at 760–15 mm. of pressure in a nitrogen atmosphere and accompanied with vigorous stirring. The product was a mixture of imidazolines in which the following structure predominated:

ing of the foregoing ingredients, there were then added the various metallic additives and in the amounts listed below. The additives were in powder form having a particle size of less than $.5\mu$. Each of the additive-containing formulations were subjected to a 7-minute cure at 200° C. on aluminum. The effects of such cure are reported as follows:

Table I

| Additive | Percent Addition | Cross-linking | Color | Adhesion | Exudation | HCl Formation |
|---|---|---|---|---|---|---|
| None | | Yes | Black | Poor | Yes | Yes. |
| ZnO | .05 | Yes | do | Fair | Yes | Yes. |
| ZnO | .1 | Yes | do | do | Yes | Yes. |
| ZnO | .2 | Yes | do | Good | No | No. |
| ZnO | 1 | Yes | Light brown | do | No | No. |
| ZnO | 5 | Yes | do | Excellent | No | No. |
| ZnO | 20 | Yes | do | do | No | No. |
| ZnS | 5 | Yes | do | Good | No | No. |
| ZnCrO$_4$ | 5 | Yes | do | Excellent + | No | No. |
| CdO | 5 | Yes | do | Good | No | No. |
| CdSO$_4$ | 5 | Yes | Brown | Fair | No | No. |
| HgO | 5 | Slight | Black | do | No | No. |
| HgCl | 20 | Slight | Brown | Excellent | No | No. |
| PbO | 5 | Yes | do | Good | No | No. |
| PbO$_2$ | 5 | Yes | do | do | No | No. |
| Pb$_3$O$_4$ | 5 | Yes | do | do | No | No. |
| Pb$_3$O$_4$ | 20 | Yes | Red | Excellent | No | No. |
| PbCrO$_4$ | 20 | Yes | Black | Excellent + | No | No. |
| B$_2$O$_3$ | 5 | Yes | do | Poor | Yes | Yes. |
| B$_2$O$_3$ | 20 | Yes | Brown | Fair | No | No. |
| Sb$_2$O$_3$ | 5 | Yes | Black | Poor | Yes | Yes. |
| Sb$_2$O$_3$ | 20 | Yes | Brown | do | Yes | Yes. |
| NiO | 20 | Yes | do | do | Yes | No. |
| BaO | 20 | Yes | Black | do | Yes | Yes. |
| CaO | 20 | Yes | do | do | Yes | Yes. |
| MgO | 20 | Yes | do | do | Yes | Yes. |
| SnO | 20 | Yes | do | do | Yes | Yes. |
| MoO$_3$ | 20 | Yes | do | do | Yes | Yes. |
| CuO | 20 | Yes | do | do | Yes | Yes. |
| Fe$_2$O$_3$ | 20 | Yes | do | do | Yes | Yes. |
| SeO$_2$ | 20 | Yes | do | do | Yes | Yes. |
| Al$_2$O$_3$ | 20 | Yes | do | do | Yes | Yes. |
| Ag$_2$O | 20 | Yes | do | do | Yes | Yes. |
| PtO$_2$ | 20 | Yes | do | do | Yes | Yes. |
| ZrO$_2$ | 20 | Yes | do | do | Yes | Yes. |
| TiO$_2$ | 20 | Yes | Brown | do | Yes | Yes. |
| K$_2$O | 20 | Yes | Black | do | Yes | Yes. |
| Na$_2$O | 20 | Yes | do | do | Yes | Yes. |
| Cr$_2$O$_3$ | 20 | Yes | do | do | Yes | Yes. |
| As$_2$O$_3$ | 20 | Yes | do | do | Yes | Yes. |

It will be noted that the materials which work well are compounds of elements in group IIB or IVA (zinc, cadmium, mercury and lead) of the periodic table and which can form complexes with amines or ammonium salts. It is interesting to note that CdO and CdSO$_4$ have the same effect regardless of acid-accepting ability. Likewise, HgO and HgCl are equivalent regardless of valence state or anion. This strongly suggests that the action of these compounds involves the metal ion complexed with imidazoline acting on single chlorine atoms to produce stabilization and some structure-promoting adhesion.

The properties of the zinc, cadmium, mercury, and lead compounds, in combination with the imidazoline and polymer, render them useful as aluminum adhesives; general adhesives; adherent, solvent resistant sealing compounds and adherent coatings.

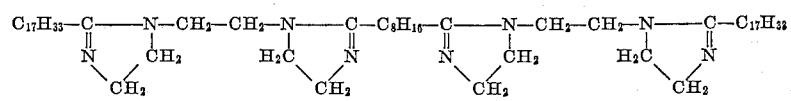

EXAMPLE 1

1 part of Imidazoline I and 3 parts of epoxidized soybean oil (preferably having an oxirane oxygen content between 6.5% and 7.5%) were reacted for 1 hour at 130° C. The resulting reaction product was then mixed thoroughly with 4 parts of Geon 121 (paste grade polyvinyl chloride). Into separate formulations consist-

EXAMPLE 2

1 part of Imidazoline I and 3 parts of epoxidized soybean oil were prereacted for 1 hour at 130° C. The reaction product was split into three portions and compounded with the following ingredients to prepare the designated formulations:

| Ingredient | Formulation (parts) | | |
|---|---|---|---|
| | A | B | C |
| The above reaction product | 50 | 50 | 50. |
| Opalon 410 (paste grade polyvinyl chloride) | 50 | 50 | 50. |
| BaSO$_4$ filler | 50 | 50 | 50. |
| Zinc Oxide | 0 | 5 | 30. |
| Viscosity at 110° F., centipoises | 10,000 | 10,000 | 20,000. |

CURED 10 MINUTES AT 200° C. ON MILD STEEL PANELS

| | | | |
|---|---|---|---|
| Color | Black | Brown | Light tan. |
| Exudation | Yes | No | No. |
| Adhesion-lbs. peel/inch width at 12″/minute jaw speed | 0 | 5 | 25 (cohesive failure). |

This example shows that addition of zinc oxide to formulations B and C favorably affects degradation and adhesion of imidazoline-polyvinyl chloride combinations.

EXAMPLE 3

100 parts of epoxidized soybean oil, 20 parts of Imidazoline II, and 100 parts of Opalon 410 were admixed and designated here as mixture "A." Portions of this mixture were then compounded with varying amounts of zinc chromate powder and cured. The specific formulations and effects of cure are reported as follows:

| Ingredient | Formulation (parts) | | | |
|---|---|---|---|---|
| | A | B | C | D |
| Mixture "A" | 20 | 20 | 20 | 20. |
| Zinc chromate powder | 1 | 2 | 4 | 8. |

CURED 5 MINUTES AT 200° C.

| | | | | |
|---|---|---|---|---|
| Adhesion to steel | Fair | Excellent | Excellent | Excellent. |
| Adhesion to aluminum | Fair | Fair | Excellent | Excellent. |
| Color* | 46 | 47 | 53 | 57. |

*(The degree of coloration bears a numerical value where white=85 and black=0, as measured on a Photovolt Reflectometer Model 610.)

The high molecular weight polyimidazoline of this example promotes adhesion to metal and, in combination with the chromate ion, provides excellent water resistance for the bond to metal. These materials are particularly useful as metal-to-metal adhesives.

EXAMPLE 4

| Ingredient | Formulation (parts) | |
|---|---|---|
| | A | B |
| Geon 101 (polyvinyl chloride) | 90 | 90 |
| Epoxidized soybean oil | 5 | 5 |
| Mineral filler (calcium carbonate) | 18 | 18 |
| Imidazoline II | 2 | 2 |
| Zinc oxide | 5 | 0 |

The materials of each formulation were milled together at 300° F. until smooth, then sheeted out and press-molded into test specimens. Cure was 15 minutes at 380° F. Properties of the cured products were as follows:

| | Formulation | |
|---|---|---|
| | A | B |
| Tensile strength at room temp., p.s.i. | 7,200 | 6,900 |
| Tensile strength at 200° F., p.s.i. | 3,500 | 700 |
| Percent Creep at 250° F./60 p.s.i. load | 10 | 150+ |

The foregoing results indicate that the curing action of imidazolines definitely improve temperature resistance of rigid polyvinyl chloride products. Without zinc oxide present in the imidazoline-cured product, it would degrade after several days at 200° F. The compound of formulation "A," however, will not degrade for at least 6 months at 220° F.

EXAMPLE 5

60 parts of epoxidized soybean oil and 10 parts of Imidazoline III were reacted for 2 hours at 130° C. 30 parts of the resulting reaction product were mixed thoroughly with 20 parts of Pliovic AO (a copolymer consisting of 93% vinyl chloride and 7% dibutyl maleate). Separate formulations of this reaction product-copolymer composition and consisting of like proportions were compounded with the additives listed below. All additives were incorporated at 20% level. The effects of such addition on cure and degradation of the composition is reflected as follows:

| Additive | Cure time at 200° C. (minutes) | Time to degrade at 200° C. (minutes) |
|---|---|---|
| None | 2 | 10 |
| ZnO | 2 | 20+ |
| CdS | 2 | 20+ |
| Hg$_2$SO$_4$ | 2 | 10 |
| PbSO$_4$ | 2 | 20 |
| Pb$_3$O$_4$ | 2 | 20+ |

Prolonged testing showed that the formulation containing Pb$_3$O$_4$ did not degrade for 3 days at 200° C. This indicates that a highly stable composition is produced. The Hg$_2$SO$_4$ formulation has limited application. It is not as effective in prolonging the usable life of the product at elevated temperatures. Previous experimentation has shown that HgCl is effective in all cases and Hg$_2$SO$_4$ is in some cases. Apparently the reaction of mercury compounds with imidazolines, as with ammonia, is extremely complex and leads to unexpected side reactions.

The following example shows the effects of separate addition of epoxy and metal compounds versus the combined addition of such compounds to a vinyl chloride copolymer.

EXAMPLE 6

| Ingredient | Formulation (parts) | | |
|---|---|---|---|
| | A | B | C |
| Flexol EP-8 [1] | 20 | 20 | 0 |
| Vinylite VYNV-II [2] | 20 | 20 | 20 |
| Zinc Oxide | 0 | 5 | 5 |
| Dioctyl adipate | 0 | 0 | 20 |
| Imidazoline IV | 10 | 10 | 10 |

[1] Epoxidized 2-ethylhexyl ester of tall oil acids.
[2] Copolymer of 97% vinyl chloride and 3% vinyl acetate.

The properties exhibited by each of the above formulations when cured at various periods are reflected in the following table:

Table II

| Formulation | 4 minute cure at 200° C. | | | 8 minute cure at 200° C. | | | 12 minute cure at 200° C. | | |
|---|---|---|---|---|---|---|---|---|---|
| | A | B | C | A | B | C | A | B | C |
| Color | Dark brown | Light tan | Tan | Black* | Tan | Light brown | (*) | Light brown | Dark brown. |
| Flexibility | Good | Excellent | Excellent | Poor | Excellent | Good | | Good | Fair. |
| Adhesion to aluminum | Poor | Good | Fair | Poor | Good | Good | | Good | Fair. |
| Crosslinking | Yes | Yes | Yes | Yes | Yes | Yes | | Yes | Yes. |

*Badly degraded attendant with HCl evolution.

Formulation A shows the effect of using an epoxide alone in controlling degradation during cure. Crosslinking was attained after 2 minutes and degradation commenced at about 4 minutes. Adhesion to aluminum was poor but adhesion to organic lacquers, such as phenolics, was much improved over a conventional plastisol.

Formulation B shows the improvement attained by addition of zinc oxide in combination with the epoxy compound, particularly in color, flexibility and adhesion to aluminum.

Formulation C shows the effect of adding zinc oxide in the absence of the epoxy compound. Metal compounds in the absence of epoxy compounds will enhance the properties, but not as much as in the presence of epoxy materials.

The mechanism in this invention is believed to involve several reactions which take place upon curing the mixture of polymer, imidazoline, epoxide and metallic compound. The initial heating of imidazoline and polyvinyl halide leads to formation of free radicals. These radicals in turn attack the sites of chain branching (being the weakest points) of the polyvinyl halide and start extracting hydrogen halide which extraction would normally lead to degradation on continued heating. The zinc, cadmium, mercury or lead compounds become partially solubilized by the imidazoline on heating in the presence of the polymer. The metal then extracts the highly labile halogen at or near the branch site, fortifying it against attack by the free radicals produced in the initial heating step. The degradative process is thus halted, allowing imidazoline and free radicals to crosslink readily, and preventing degradative by-products from exuding to the polymer surface which would destroy any adhesive bond that may have been formed. The imidazoline, having chemically grafted to the polyvinyl halide can now act as a "solid wetting agent" to anchor the polymer to a metal or other surface to which adhesion is usually difficult. Long chain 2-substituted-2-imidazolines and 1,2-disubstituted-2-imidazolines are strongly polar, possess high surface activity and are attracted to many surfaces.

During the curing process, the epoxy molecules are grafted to the crosslinked polymer and become inextractable after curing is completed. Since the epoxy compound is "built" into the polymeric system, the polymer is endowed with permanent flexibility which is desirable for many applications.

The proportions of imidazoline, epoxide and metal compound which may be added to the polymer and copolymer may vary depending upon the type of processing to be used, e.g., plastisol, organosol, extrusion, molding, calendering, etc., and the properties desired. In general, the imidazoline may constitute between about .5 and 50, preferably 5 to 10, parts of the final composition; the epoxy compound may range between about 5 to 60, preferably 20 to 40, parts; and the metal compound may range between about .5 and 50, preferably 1 to 20, parts. Curing of the composition is generally effected by heating at about 150 to 225° C. for about 30 to 0.5 minutes, preferably 180 to 200° C. for about 10 to 2 minutes.

We claim:

1. A composition comprising 4 to 100 parts of a vinyl halide polymer, 5 to 60 parts of a non-resinous epoxy compound which is devoid of terminal epoxy groups, .5 to 50 parts of an imidazoline and .5 to 50 parts of a metallic compound which is capable of forming ammonia complexes and is a compound of a metal selected from the group consisting of zinc, cadmium, mercury and lead.

2. A composition comprising 4 to 100 parts of a polymeric material selected from the group consisting of homopolymers and copolymers of vinyl chloride, 5 to 60 parts of a non-resinous epoxy compound which is devoid of terminal epoxy groups, .5 to 50 parts of an imidazoline, and .5 to 50 parts of a metallic compound which is capable of forming ammonia complexes and is a compound of a metal selected from the group consisting of zinc, cadmium, mercury, and lead.

3. A composition according to claim 1 wherein the epoxy compound is selected from the group consisting of epoxidized triglycerides of fatty oil acids; epoxidized esters of ethenoid alcohols and saturated carboxylic acids; epoxidized esters of saturated alcohols and ethenoid carboxylic acids; epoxidized esters of ethenoid alcohols and ethenoid carboxylic acids; and an epoxidized olefin selected from the group consisting of monoolefins, diolefins and polymeric olefins.

4. A composition according to claim 3 wherein the imidazoline constitutes between about 5 to 10 parts, the metal compound constitutes between about 1 to 20 parts, and the epoxy compound constitutes between about 20 to 40 parts.

5. A thermoset polymer obtained by heating the composition of claim 3 to a curing temperature.

6. A composition comprising 4 to 100 parts of a vinyl chloride polymer, 1 to 20 parts of an imidazoline, 1 to 30 parts of a metallic compound which is capable of forming ammonia complexes and is a compound of a metal selected from the group consisting of zinc, cadmium, mercury and lead, and 3 to 100 parts of an epoxidized fatty oil acid triglyceride.

7. A composition according to claim 6 wherein the epoxidized triglyceride is epoxidized soybean oil.

8. A composition comprising 4 parts of polyvinyl chloride, 3 parts of epoxidized soybean oil, 1 to 20 parts of a metallic compound which is capable of forming ammonia complexes and is a compound of a metal selected from the group consisting of zinc, cadmium, mercury and lead and 1 part of an imidazoline.

9. A composition comprising 20 parts of a mixture derived by admixing (a) 100 parts of epoxidized soybean oil, (b) 100 parts of polyvinyl chloride and (c) 20 parts of an imidazoline and 1 to 8 parts of zinc chromate.

10. A composition comprising 90 parts of polyvinyl chloride, 5 parts of epoxidized soybean oil, 18 parts of mineral filler, 5 parts of zinc oxide and 2 parts of an imidazoline.

11. A composition comprising 3 parts of a product obtained by reacting at 130° C. for 2 hours (a) 6 parts of epoxidized soybean oil and (b) 1 parts of an imidazoline, 2 parts of a vinyl chloride-dibutyl maleate copolymer and 2 parts of a metallic compound which is capable of forming ammonia complexes and is a compound of a metal selected from the group consisting of zinc, cadmium, mercury, and lead.

12. A composition comprising 4 parts of a vinyl chloride-vinyl acetate copolymer, 4 parts of epoxidized 2-ethylhexyl ester of tall oil acid, 1 part of zinc oxide and 2 parts of an imidazoline.

References Cited by the Examiner

UNITED STATES PATENTS

| | | | |
|---|---|---|---|
| 2,103,581 | 12/1937 | Gray | 260—45.9 |
| 2,155,877 | 4/1939 | Waldmann et al. | 260—309 |
| 2,157,997 | 5/1939 | Brous | 260—92.8 |
| 2,329,456 | 9/1943 | Campbell | 117—132 |
| 2,365,400 | 12/1944 | Fikentscher | 260—45.9 |
| 2,476,832 | 7/1949 | Donia | 260—92.8 |
| 2,843,557 | 7/1958 | Safford | 260—30.6 |
| 2,953,537 | 9/1960 | McBrien | 260—45.85 |
| 2,965,586 | 12/1960 | Fisch et al. | 260—37 |
| 2,985,617 | 5/1961 | Salyer et al. | 260—45.7 |
| 3,002,941 | 10/1961 | Peterson | 260—18 |
| 3,147,705 | 9/1964 | Broderick et al. | 260—23 |
| 3,183,207 | 5/1965 | Nimoy et al. | 260—92.8 |

OTHER REFERENCES

Falkenburg et al.: Oil and Soap, June 1945, pp. 143–148.

Benington et al.: "Journ. of Chem. Soc.," 1948, pp. 771–774, London.

Zimmerman et al.: "Rubber Age," vol. 68, No. 3, pp. 311–318, December 1950.

Lee et al.: "Epoxy Resins," p. 15, McGraw-Hill Co., Inc., New York 1957.

LEON J. BERCOVITZ, *Primary Examiner.*

ALPHONSO D. SULLIVAN, MILTON STERMAN, *Examiners.*